Nov. 12, 1963  V. L. PEICKII  3,110,095
METHOD OF INSTALLING A SHAFT SEAL WITHIN A HOUSING
Original Filed March 17, 1961  5 Sheets-Sheet 3
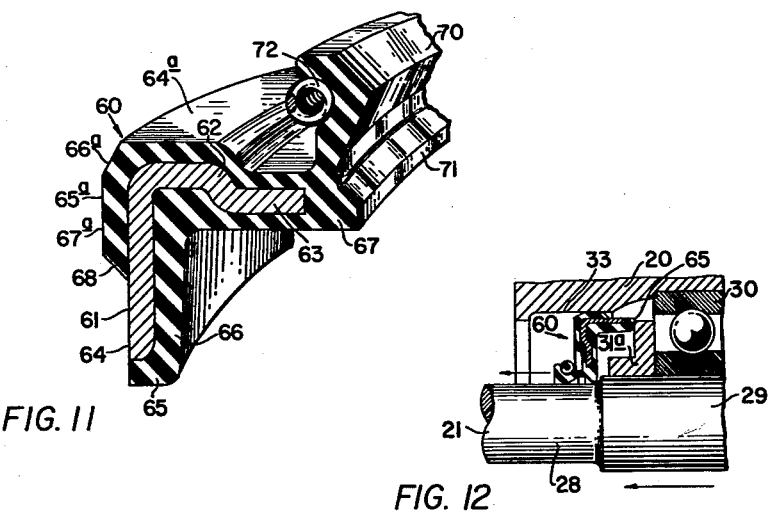
FIG. 11
FIG. 12
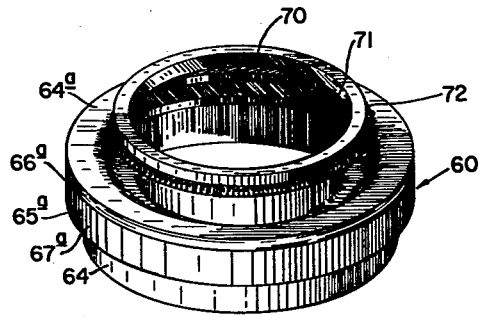
FIG. 9
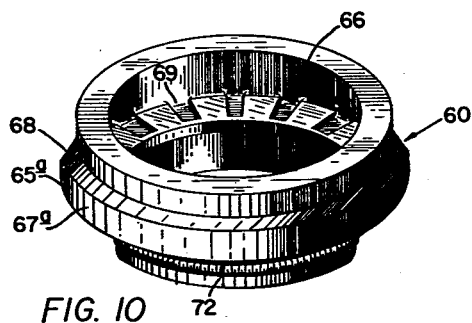
FIG. 10

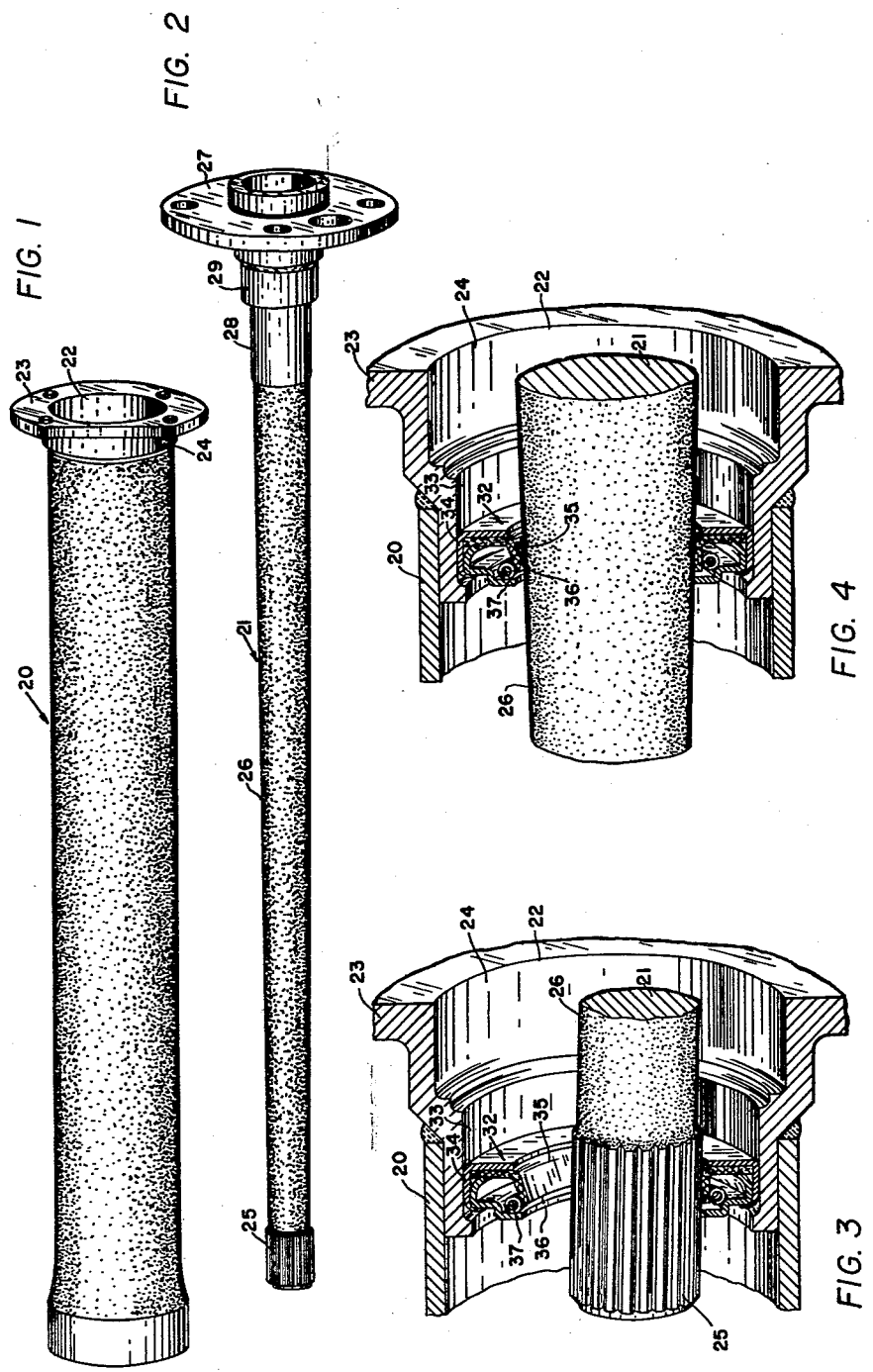

Nov. 12, 1963 V. L. PEICKII 3,110,095
METHOD OF INSTALLING A SHAFT SEAL WITHIN A HOUSING
Original Filed March 17, 1961 5 Sheets-Sheet 4
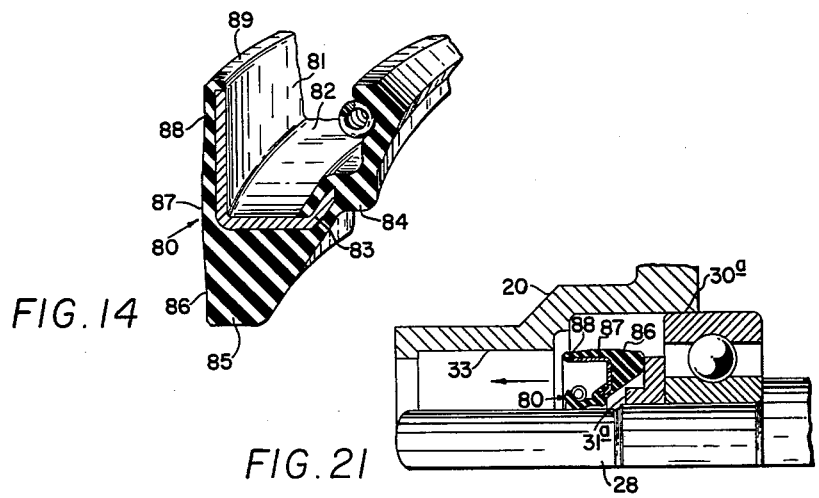
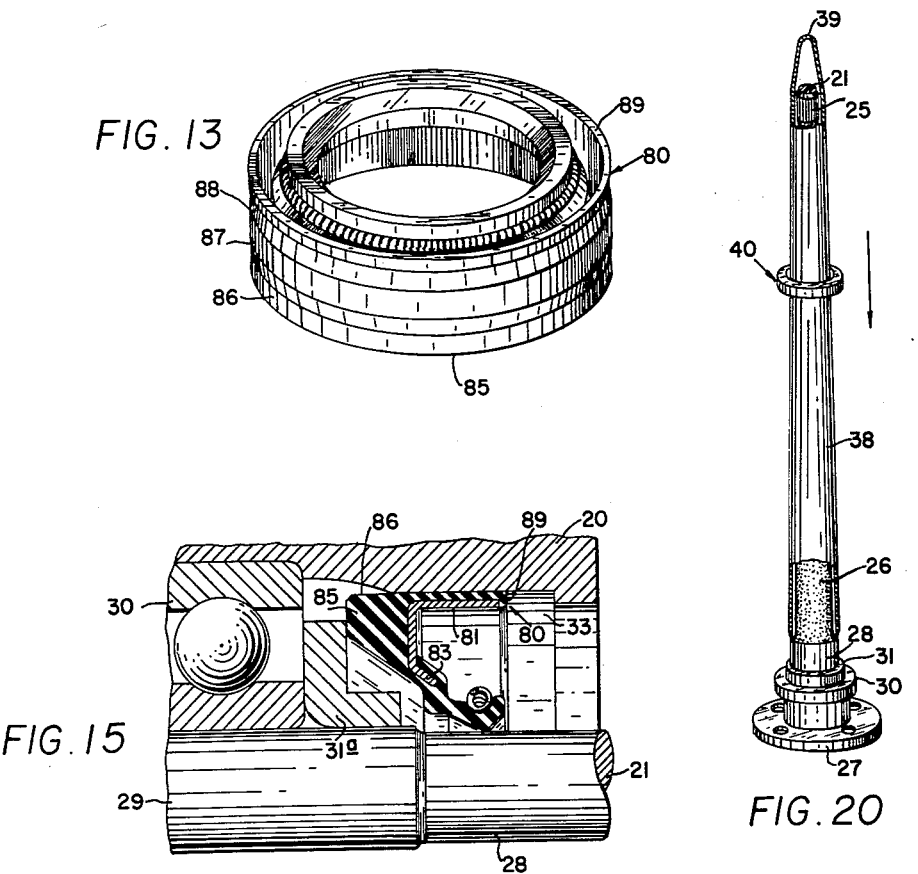

Nov. 12, 1963    V. L. PEICKII    3,110,095
METHOD OF INSTALLING A SHAFT SEAL WITHIN A HOUSING
Original Filed March 17, 1961    5 Sheets-Sheet 5

United States Patent Office 3,110,095
Patented Nov. 12, 1963

3,110,095
METHOD OF INSTALLING A SHAFT SEAL
WITHIN A HOUSING
Vasalie L. Peickii, Hillsborough, Calif., assignor to Federal-Mogul-Bower Bearings, Inc., Detroit, Mich., a corporation of Michigan
Original application Mar. 17, 1961, Ser. No. 96,523. Divided and this application Oct. 13, 1961, Ser. No. 149,302
5 Claims. (Cl. 29—401)

This invention relates to an improved radial shaft seal and to an improved method of installing a radial shaft seal in the rear axle of an automobile and in similar types of installations. This application is a division of application Serial No. 96,523 filed March 17, 1961.

Of all the places where oil seals are used in contemporary automobiles, the rear wheel axle position has been the most difficult to seal. The operating conditions there are severe and require careful consideration, and in addition there have been special difficulties in installing the seals so that many seals have been damaged while being installed, the damage being discovered only later.

So far as operating conditions are concerned, lubricant oils of high-additive, corrosive type have been used to lubricate the rear axle bearings, and these tend to attack sealing elements, particularly at high temperatures, necessitating the use of elastomeric compounds able to resist this chemical action. Also the sealing element compound must be of a type that can run dry when the axle is tipped, as on crowned roads or during turning. The actual compound used lies outside the scope of the present invention except that the types of materials able to stand the corrosive lubricant at high temperatures are often those which are the most likely to be damaged physically during installation of the axle.

An important object of the invention is to provide an improved oil seal of the radial shaft type which enables a novel method of installation that protects the oil seal from damage by the shaft and which also assures proper installation of the seal.

Another object of the invention is to provide a novel type of oil seal and a novel method of installation that enables the installer to place the seal in its proper position without having to use any special tools. At the present time, tools have been almost universally used, usually power tools, and they have not given satisfactory results because they have tended to produce cocked or off-center installations in the bore, with the result that the seal is more easily damaged when the axle is installed. The use of tools gives no assurance that the seal will be pressed to the bottom of the bore or that the seal will be square with the bore and the shaft. Also, the installation of rear axle seals by power tools has usually involved coating the seal with a synthetic cement and, due to the method of installation heretofore in use, this cement has tended to come off on the lip of the seal and damage it. In the present method of installation the seal is installed properly, is protected from damage, and there is no need to apply cement at all; therefore, many problems are completely eliminated.

Other objects and advantages of the invention, as well as the problems which it solves, will be explained later in the specification with the aid of the drawings.

In the drawings:

FIG. 1 is a perspective view of an automobile rear axle housing.

FIG. 2 is a similar view of a rear axle which is to be installed in the housing.

FIG. 3 is a fragmentary enlarged view in perspective showing how spline damage occurs when oil seals are installed in rear axles according to conventional methods of installation.

FIG. 4 is a similar view showing how further damage to conventional seals occurs during conventional installation as the rough shaft tends to rub against the sealing element.

FIG. 9 is a view in perspective of a modified form of seal embodying the principles of the invention.

FIG. 10 is a view similar to FIG. 9 but with the seal inverted.

FIG. 11 is an enlarged fragmentary view in perspective and in section of the seal of FIGS. 9 and 10.

FIG. 12 is a fragmentary view in elevation and in section showing a seal of FIGS. 9 through 11 installed.

FIG. 13 is a view in perspective of another modified form of radial shaft seal also embodying the principles of the invention.

FIG. 14 is an enlarged fragmentary view in perspective and in section of the seal of FIG. 13.

FIG. 15 is a view in elevation and in section of an installation of the seal of FIGS. 13 and 14.

FIG. 20 is a perspective view of an axle upon which a seal of this invention is being installed by the method of this invention.

FIG. 21 is a fragmentary view in elevation and in section of the installation of FIG. 15 at a slightly later stage when the bearing has contacted its bore and before the seal contacts its bore.

Figure 5:
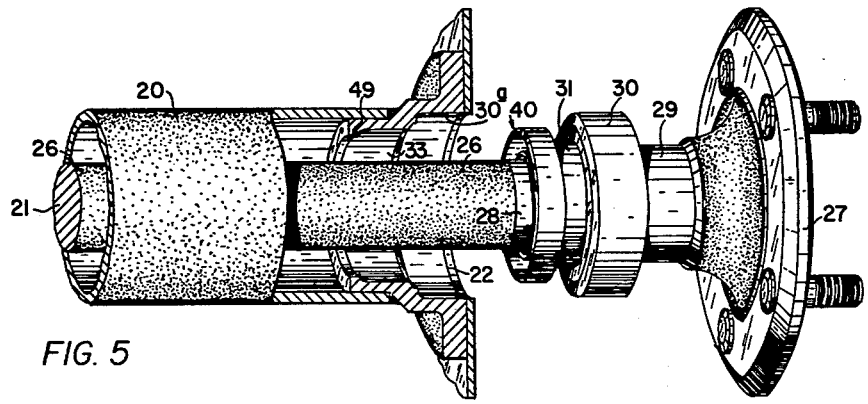
FIG. 5 is a similar view showing an installation of an axle in an axle housing using a novel method of installing the oil seal embodying the principles of this invention and employing an oil seal constructed according to the principles of the invention.
Figures 6, 7:
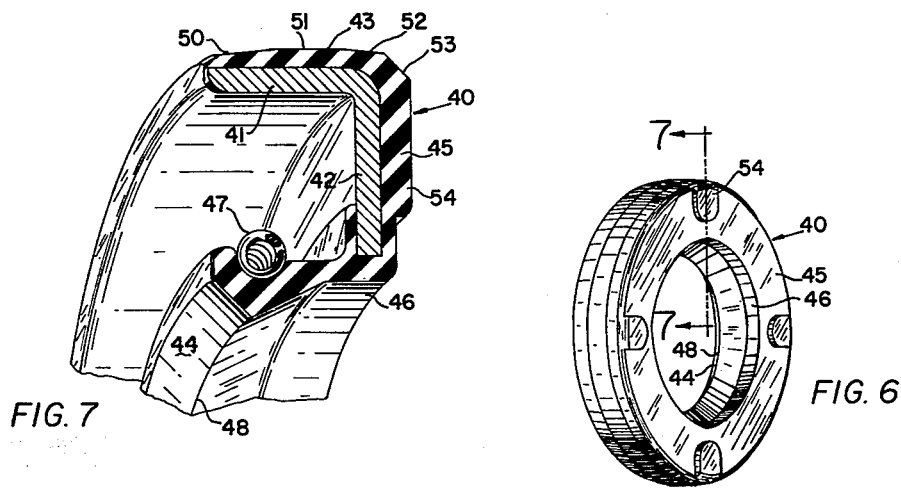
FIG. 6 is a view in perspective of an oil seal embodying the principles of the invention.
FIG. 7 is an enlarged fragmentary view in perspective and in section taken along the line 7—7 in FIG. 6.
Figure 8:
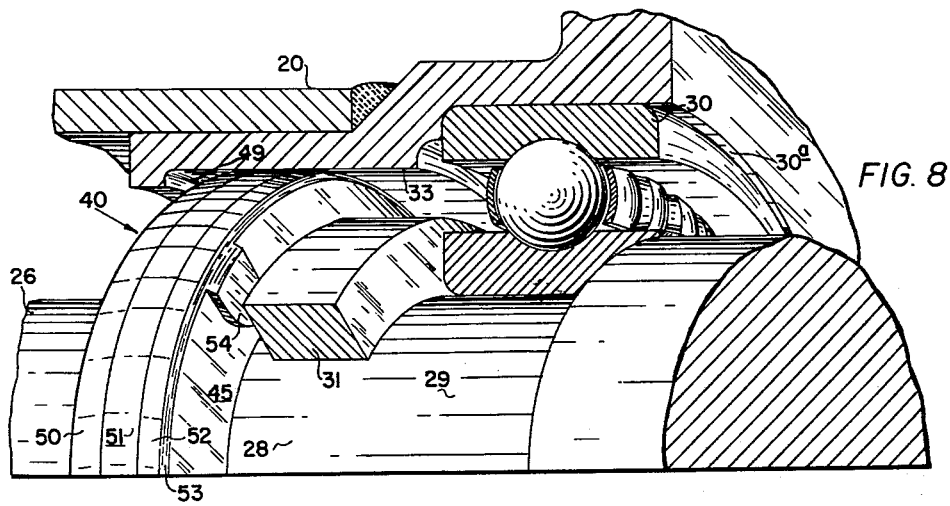
FIG. 8 is an enlarged fragmentary view in perspective showing an installed seal of the type shown in FIGS. 6 and 7.
Figure 18:
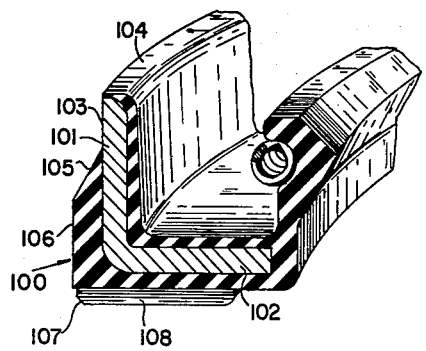
FIG. 18 is an enlarged fragmentary view in perspective and in section of the seal of FIGS. 16 and 17.
Figure 19:
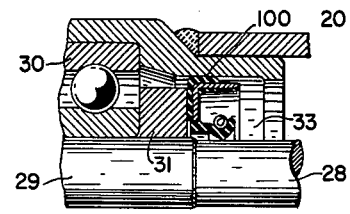
FIG. 19 is a view in elevation and in section of an installation incorporating the seal of FIGS. 16 and 18.
Figure 16:
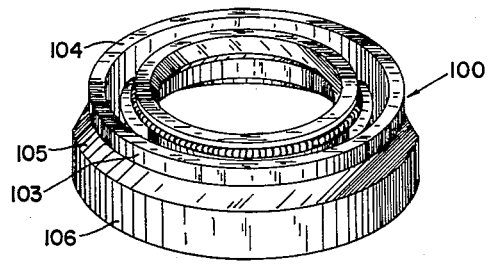
FIG. 16 is a view in perspective of another modified seal embodying the principles of the invention.
Figure 17:
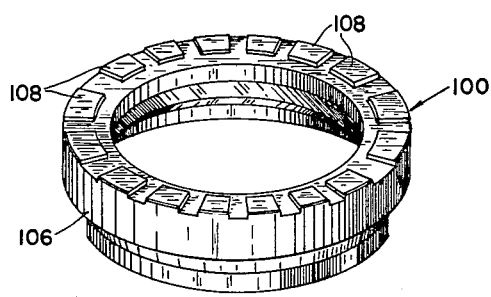
FIG. 17 is a view of the seal of FIG. 16 but with the seal inverted.

FIG. 1 shows an automobile axle housing 20 of the type where the problem occurs, and FIG. 2 shows an automobile rear axle 21 which is to be installed into the housing 20. As is conventional, the axle 21 must be installed through the opening 22 of the housing 20, where the housing also has a flange 23 and an enlarged entry portion 24. The axle 21 has a spline 25 on its inner end, and has a reduced diameter shaft portion 26 which is usually about 24 inches long and is normally rough forged steel covered with mill scale surface. Often the portion 26 is tapered up to above the size of the inner diameter of the oil seal, and parts of it may be machined, leaving sharp burred surface portions. At its outer end the axle 21 has a flange 27 and between that and the portion 26 is a flared enlarged portion 28 which the seal is to engage when the axle 21 is installed. Between the portion 28 and the flange 27 is a further enlarged portion 29 on which a bearing 30 is mounted (see FIG. 8). Next to the bearing 30 there is usually a hard annulus known as a "wedding ring" 31. The bearing 30 is lubricated, and the purpose of an oil seal at this point is partly to retain the bearing lubricant and partly to exclude the rather corrosive axle lubricant from the bearing 30. However, an oil seal is unable to prevent the passage of either lubricant if the sealing surface of the oil seal is damaged and, as mentioned above, it has very frequently happened that the mere installation of the axle 21 damages the seal.

As shown in FIG. 3, the installation practice heretofore has been to install an oil seal 32 in a bore portion 33. The prior art oil seals 32 usually have metal cases 34 that are covered with rubber cement before installation in contact with the bore 33. The seal 32 has a sealing member 35 whose lip 36 is later to contact the shaft 28, being held in contact therewith by a spring 37. During installation of the axle 21 the first portion to be inserted is the spline 25, and when the spline 25 is inserted, its sharp rough edges have often been brought into contact with the sealing member 35, as shown in FIG. 3, frequently gouging out portions of its lip 36. These rear axles 21, being about thirty inches long, are rather heavy and it is difficult to avoid touching the oil seal 32 with the spline 25. Many workmen have not taken the trouble to avoid such touching because of the difficulty and, even though others have taken the trouble, they have found it difficult to avoid rubbing the spline 25 across a portion of the oil seal 32. If the spline 25 is allowed to gouge out even a fairly inconspicuous groove in the sealing element 35, it is quite likely there will be leakage, and small leakage will lead to additional leakage. If the leakage proceeds far enough it can endanger the supply of lubricant to the bearings 30 or can result in loss of the axle lubricant and attack of the bearing by it and therefore can eventually cause the bearings 30 or the gears (not shown) to burn out.

Thus, as FIG. 3 shows, the seal 32 is likely to be damaged at once by the splines 25. Furthermore, as FIG. 4 shows, about two feet of rough-forged axle surface 26 succeeds the splines 25. The beginning of the portion 26 is usually substantially smaller than the oil seal 32 but nevertheless difficult to balance so as to prevent rubbing contact, and tends to touch and to be rubbed across the sealing element 35 and the lip 36. Moreover, many such axles are tapered so that the portion 26 has a portion of substantial length larger than the inner diameter of the seal 32. If either the spline 25 or the long rough-forged portion 26 is allowed to drag across the seal 32 even momentarily, considerable damage to the sealing element can be caused, and extremely hard and abrasive mill scale may be embedded into the lip 36, which later will severely groove the shaft 28 as the lip 36 wipes it. The matter is even more serious with a tapered axle 21, where a considerable length of the portion 26 has necessarily engaged and flexed the lip 36, forcefully being dragged through it.

These problems are not theoretical. They have caused considerable damage and have sometimes resulted in the manufacturer having to replace the rear axle 21 within the guarantee period simply because the initial damage to the oil seal 32 caused leakage resulting in the bearings or gears runing dry and the shaft being grooved. The repair work is expensive and time-consuming and gives an unfavorable impression of the reliability of the automobile.

These, then, are the problems which the present invention is designed to solve. How it does will now be explained by reference to several different embodiments, any of which may be used and any of which may be preferred, depending upon the particular installation involved and conditions which are to be met.

*The Seal 40 of FIGS. 5 Through 8, and 20 and Its Installation*

A very important feature of the present invention is that the oil seal 40 of this invention is installed on the axle 21 on the shaft portion 28 adjacent the wedding ring 31 rather than being installed initially in the bore 33 of the axle housing 20. The oil seal 40 itself being very light and being quite maneuverable can easily and safely be put over the axle spline 25 and the rough portion 26 and moved up on the sealing portion 28. If the rough portion 26 is sufficiently small, this alone may be sufficient, but preferably—and necessarily when the rough portion 26 is tapered up to the size of the shaft 28—the expedient shown in FIG. 20 is employed. There a sleeve 38, preferably metal, having smooth exterior walls and a bullet-like end 39, is placed over the shaft 21, which is preferably stood on its flanged end 27. The sleeve 38 covers the splines 25 and rough portion 26 and protects the oil seal 40 until it reaches the desired shaft portion 28 against which it is to seal. This insures the greatest protection of the sealing lip.

The next leading feature of the invention is that when the axle 21 is installed into the housing 20, the oil seal 40, which has to be centered in the bore 31 in order to seal properly, is already centered on the axle 25 itself. Being designed for a snug fit, it will necessarily be properly aligned when installed. Moreover, the design is such that the bearing 30 engages its bore 30a (cf. FIG. 21) before the seal 40 reaches its bore 33, and thereby the bearing 30 aligns the seal and assures that the axle 21 and the seal 40 will be properly centered in the bore 33.

Conventional oil seals such as those shown in FIGS. 3 and 4 could not satisfactorliy be installed in this manner for their metal cases 34 could not be press fit into the bore 33 by use of the axle 21 without the use of considerable force and therefore probably entailing damage to the sealing members. Therefore, the present invention provides a new type of oil seal specially adapted for installation initially on the rear axle 21, and then to be pushed into the housing bore 33 and seated properly without cocking or any damage to the seal. One such seal 40 is shown in FIGS. 5 to 8. This seal 40 has a metal case with an axial cylindrical portion 41 and a radial portion 42, but the axial portion 41 is covered by a generally cylindrical rubber covering 43 of the same synthetic material from which the sealing lip 44 is made. In fact, the elastomeric member is integral, the portion 43 being connected to a portion 45 that covers the radial flange 42 and having a portion 46 by which the lip portion 43 is anchored, and the lip portion 44 itself. Preferably a spring 47 urges the actual sealing lip 48 into snug sealing contact on the shaft 28.

The outer elastomeric portion 43 is particularly significant and important. As shown, it is not exactly cylindrical although the flange 41 is cylindrical. Instead, preferably there is a lead-in portion 50 providing a long reduced frusto-conical lead on the toe of the seal. This prevents damage to the sealing lip even if the seal should engage the bore end wall or shoulder 49, and it assures proper seal alignment in the bore. As the axle 21 is installed, instead of a cylindrical section suddenly coming into contact with the bore 33, the lead-in portion 50 first approaches it and helps to guide the subsequent cylindrical section 51 into the bore. Thence there is a lead-away frusto-conical portion 52 and a splayed frusto-conical portion 53 at the rear end against which the wedding ring 31 pushes during installation. The cylindrical portion 51 is preferably made slightly oversize so that it will assure a snug fit in the bore. The portions 50, 52 and 53 assure the fact that when the elastomer flows, as it necessarily will when it comes in contact with the smaller bore, there will be room for it to flow without having to cock the seal or do anything that would cause misalignment. This is assured by the portions 50 and 52 on each side of the cylindrical portion 51.

On the rear face 45 against which the wedding ring 31 is pushed, a plurality of raised portions or pads 54 are preferably formed projecting axially beyond the surface 45 and giving the wedding ring 31 a series of portions against which to seat and push. One of the significant things here is that when the seal is fully installed there are spaces between the pads 54 through which oil may freely flow. Thus, the bearing 30 is assured of an adequate supply of lubricant, since an undamaged seal will last for a considerable time, and that time will be on the average many times what it is when the seal is installed by the present procedures.

The Seal 60 of FIGS. 9 Through 12

The seal 60 shown in FIGS. 9 through 12 in many ways resembles the seal 40 but has some special features. In this instance there is again a metal case with a cylindrical portion 61 and a radial portion 62, having an in-stepped radial portion 63. The metal flange is substantially rubber covered but preferably has a bare portion 64 at the end which faces the wedding ring 31a. The toe of the seal which touches the wedding ring 31a is covered by a rubber portion 65 which is integral with a portion 66 on the inner surface of the flange 61 and with a lip section 67. The elastomer extends around the other side of the flanges 62 and 63, a portion 64a adjoining it to a portion 65a on the outer side of the flange 61. This portion 65a has a lead-in portion 66a, a cylindrical portion 67a and a lead-out portion 68, enabling the flow of elastomer. As can be seen best in FIG. 10, the inner surface of the portion 66 has chaplets 69. This seal 60 is a dual-lip seal having a main sealing lip 70, with a spring 72, and a secondary runout-protecting lip 71 which is not intended to actually seal against the shaft but is intended to protect the seal during the runout conditions.

For installation, the seal 60 is again installed on the shaft portion 28 before the axle 21 is installed and is then pushed into the bore 33 in the direction shown by the arrow in FIG. 12. The wedding ring 31a engages the toe covering 65 and pushes the seal 60 ahead of it. The lead-in portion 66a first engages the bore 33 and leads the seal 60 into it, while the lead-out portion 68 and the bare portion 64 provide ample space for the elastomer to flow, so that the seal can have plenty of tolerance built in. Often the axle-bore relationships are such that considerable tolerance is needed to assure a snug fit in all of the housings and also to assure that there not be any looseness in any of the housings. The provision of the space in which the elastomer can flow is therefore quite important.

The Seal 80 of FIGS. 13 Through 15 and 21

The seal 80 again has a cylindrical metal case portion 81, a radial case portion 82, and an inclined terminal inner end portion 83 to which a lip anchor portion 84 is secured. In this instance a bumper portion 85 covers the flange 82 and is engaged by the wedding ring 31a and it has an outer tapered surface 86 to provide for rubber flow from the cylindrical maximum diameter portion 87. There is also a lead-in portion 88 with a forward protecting bumper 89 extending over the case toe. Thus when the seal is installed, the wedding ring 31a pushes against the bumper portion 85, the lead-in portion 88 guides the seal into the bore 33 and the portion 87 insures a snug fit, the elastomer flowing into the portions provided by the tapered portions 86 and 88 to accommodate the tolerance.

The Seal 100 of FIGS. 16 Through 19

FIGS. 16 through 19 show a seal 100 again basically similar to the seals 40, 60 and 80 heretofore shown but having some differences. In this instance, the seal has a cylindrical axial metal case portion 101, and a radial portion 102. There is a bare portion 103 of the cylindrical portion 101 which in this instance is used to provide the lead-in for the seal, and there is a front bumper 104 over the toe, provided by a portion of the elastomeric sealing element. There is also a lead-in taper 105 leading from the bare portion to the cylindrical portion 106, and a lead-away taper 107. A series of chaplets 108 are provided for contact with the wedding ring 31. This seal 100 is installed in the opposite direction to that of FIGS. 9 through 12 by the wedding ring 31 pushing against the chaplets 108 and forcing the bumper portion 104 first into the bore 33 and then following it up with the bare portion 103 and tapered lead-in 105, so that snug fit is assured by the portion 106 with plenty of room for elastomer to flow toward the bare portion 103 as well as toward the tapered rear portion 107. Thus, again, a seal is provided which is capable of the novel method of installation of this invention and which protects the axle, axle housing and bearing when installed, and is itself protected during installation.

Summary of Operation

The installation procedure of the invention calls for placing the oil seal first on the rear axle 21 at the very portion 28 where it is to seal and in contact with the wedding ring 31 or 31a. This is best done by using the smooth-walled installation sleeve 38 of FIG. 20 to protect the seal from the rough axle portion 25 and 26. When the axle 21 is then installed there is no concern about the effect it has on the seal, so long as the spline 25 is kept out of contact with the bore 33 itself. The seal, in order to accommodate this type of installation is of the rubber covered type, but instead of being the usual rubber covered type is provided with tapered lead-in and lead-out portions on each side of a cylindrical portion that fits snugly into the bore 33, providing ample room for the elastomer to flow during installation. Also, the seal is provided with bumper portions at both ends to protect the bore 33 from damage by the seal and to protect the seal from damage by the wedding ring 31 or 31a. During installation, as shown in FIG. 21, the bearing 30 engages its bore 30a before the seal reaches the bore 33, thereby protecting the seal, aligning it and centering it.

To those skilled in the art to which this invention relates, many additional changes in construction and widely differing embodiments of the invention will suggest themselves without departing from the spirit and scope of the invention as defined in the claims.

What is claimed is:

1. A method of installing a radial shaft seal adjacent a ball-bearing between an automobile rear axle and a rear axle housing having a housing bore with an inner shaft-sealing receiving portion and an outer ball-bearing receiving portion, said axle having at one end an end flange adapted to lie outside said housing closely adjacent the ball-bearing receiving bore portion and having a spline portion at its other end, there being a smooth bearing-supporting portion closely adjacent said end flange on which said ball-bearing is installed, a wedding ring adjacent said ball-bearing, a smaller-diameter seal-engaging shaft portion adjacent said wedding ring and remote from said bearing receiving portion, and an elongated rough portion between said shaft portion and said spline, said method comprising: (a) placing said bearing and said wedding ring on their receiving portions of the axle, (b) then placing a sleeve with a smooth outer surface very close in diameter to that of said axle over the spline end of said axle to cover said spline portion and said rough portion and to provide a smooth surface ending at said shaft portion; (c) placing said radial shaft seal around said sleeve and moving it axially along said sleeve to said shaft portion and off said sleeve and around said shaft portion; (d) removing said sleeve from said axle; (e) inserting said axle, spline end first, into said bore with the bearing, wedding ring and shaft seal mounted on their receiving portions on said axle; (f) moving said axle with the bearing, wedding ring and shaft seal mounted on their receiving portions on said axle into said bore until said ball-bearing engages its receiving bore portion and thereby centers said shaft relative to said bore before said seal touches its bore; and (g) moving said axle on into place, so that said shaft seal is pushed by said wedding ring into its receiving bore portion.

2. A method of installing an automobile rear axle seal between a rear axle and a rear axle housing adjacent a bearing, said housing having an inner shaft seal receiving housing bore and an outer bearing-receiving portion at one end, said axle having a flange adapted to lie fairly close to the housing bore when the axle is installed, with a bearing-receiving portion adjacent thereto and a seal-engaging shaft portion separated from said bearing-receiving portion by a wedding ring receiving portion, a rough portion of substantial length extending from said shaft portion toward the opposite end of the axle, and a spline portion at said opposite end, said method comprising installing the seal on the rear axle by providing means with a smooth outer surface over said spline portion and said rough portion, placing said seal around said means, moving said seal axially along the outer surface of said means to said shaft portion and off said means and around said shaft portion, removing said means from over said spline portion and said rough portion, and then inserting said axle with the bearing, wedding ring and shaft seal mounted on their respective receiving portions of said axle, into the housing with the spline end entering said bore first and being kept out of contact with said bore portion, said shaft seal being thereby carried into said bore and seated there and being pushed into place by said wedding ring.

3. A method of installing a radial shaft seal adjacent a ball-bearing between an automobile rear axle and a rear axle housing having a housing bore with an inner shaft seal receiving portion and an outer bearing-receiving portion, said axle having a bearing and a pushing means installed near one end for pushing said seal and having a spline portion at its other end, there being a smooth shaft seal-receiving portion adjacent said pushing means on the opposite side thereof from said bearing and an elongated rough portion between said shaft portion and said spline, said method comprising: (a) placing a sleeve with a smooth outer surface over the spline end of said axle to cover said spline portion and said rough portion and to end at said shaft portion; (b) placing said radial shaft seal around said sleeve and moving it axially along said sleeve to said shaft portion and off said sleeve and around said shaft portion; (c) removing said sleeve from said axle; and (d) inserting said axle with the seal, the pushing means, and the bearing thereon, spline end first, into said bore until said seal engages its said receiving portion.

4. A method of installing a radial shaft seal adjacent a ball-bearing between an automobile rear axle and a rear axle housing having a bore with an inner shaft seal receiving portion and an outer bearing-receiving portion, said axle having near one end a bearing and pushing means installed thereon and having a spline portion at its other end, there being a smooth seal-engaging shaft portion adjacent said pushing means and remote from the bearing and an elongated rough portion between said shaft portion and said spline, said method comprising: providing means with a smooth outer surface over said spline portion and said rough portion, placing said seal around said means, moving said seal axially along the outer surface of said means to said shaft portion and off said means and around said shaft portion, removing said means from over said spline portion and said rough portion, and then inserting said axle, spline end first, into said bore with said seal, bearing and pushing means thereon and moving said seal with said seal, bearing and pushing means, thereon into said bore so that said shaft seal is pushed by said pushing means into said seal's receiving bore portion.

5. A method of installing a radial shaft seal adjacent a ball-bearing between an automobile rear axle and a rear axle housing having a housing bore with an inner shaft seal receiving portion and an outer ball-bearing receiving portion, said axle having at one end an end flange adapted to lie outside said housing closely adjacent the ball-bearing receiving bore portion and having a spline portion at its other end, there being a smooth bearing-supporting portion closely adjacent said end flange on which said ball-bearing is installed, and a wedding ring adjacent said ball bearing, a smaller diameter seal-engaging shaft portion adjacent said wedding ring and remote from said bearing-supporting portion, and an elongated rough tapered portion between said shaft portion and said spline, a portion of said rough portion having a diameter larger than the inner diameter of said seal, said method comprising: (a) placing said ball bearing and wedding ring on their receiving portions on the axle, (b) then placing a tapered sleeve with a smooth outer tapered surface very close in diameter to said shaft portion over the spline end of said axle to cover said spline portion and said rough portion and to end at said shaft portion; (c) placing said radial shaft seal around said sleeve and moving it axially along said sleeve to said shaft portion and then off said sleeve and around said shaft portion; (d) removing said sleeve from said axle; (e) inserting said axle with the bearing, wedding ring and shaft seal mounted on their receiving portions on said axle, spline end first, into said bore; (f) moving said axle with the bearing, wedding ring and shaft seal mounted on their receiving portion on said axle until said ball-bearing first engages its receiving bore portion and thereby centers said shaft and said seal relative to said bore; and (g) moving said axle further on into final position with said shaft seal being pushed by said wedding ring into its receiving bore portion.

References Cited in the file of this patent
UNITED STATES PATENTS
1,965,876    Bettis _____ July 10, 1934